Jan. 6, 1970 R. K. AMES 3,488,401
SABATIER OXYGEN REGENERATION SYSTEM WITH USEFUL BY-PRODUCT
Filed Sept. 25, 1967
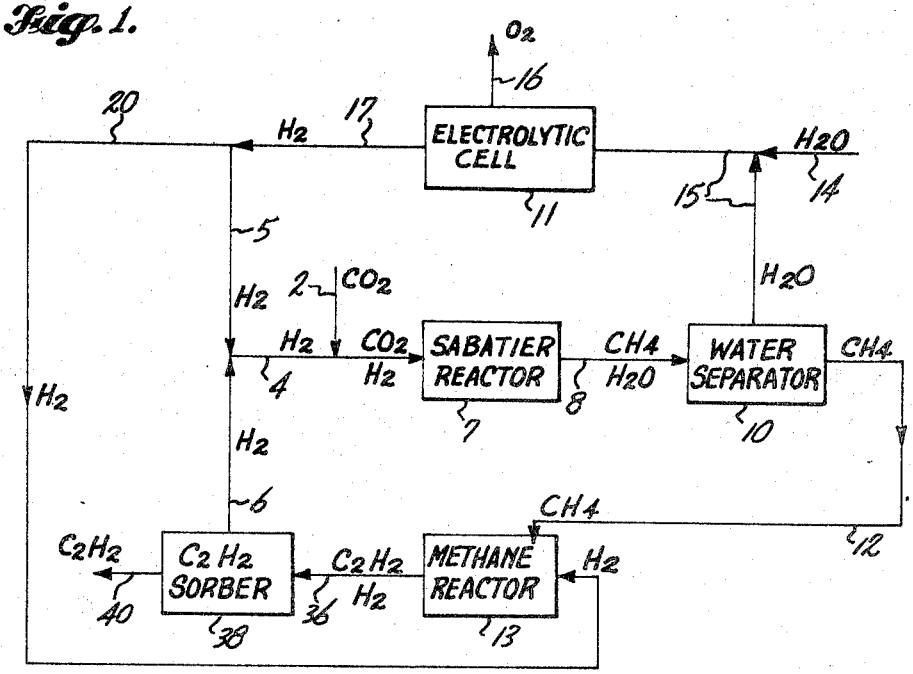
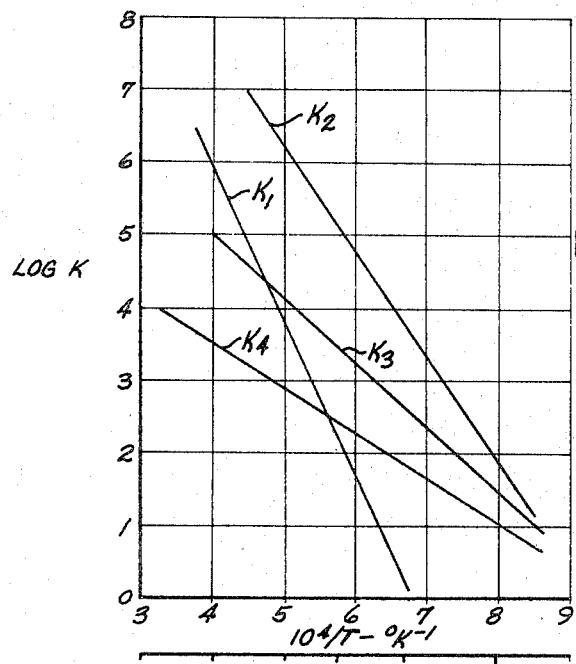
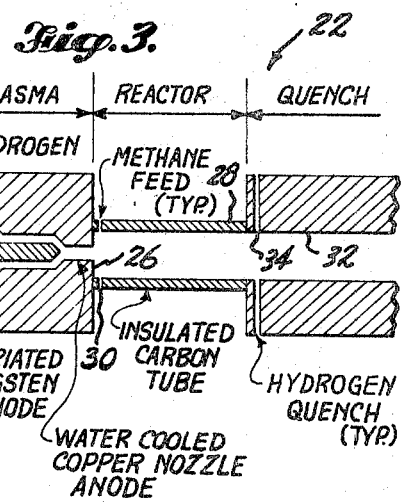
INVENTOR.
ROBERT K. AMES
BY Christensen,
Sanborn & Matthews
ATTORNEY United States Patent Office 3,488,401
Patented Jan. 6, 1970

3,488,401
SABATIER OXYGEN REGENERATION SYSTEM WITH USEFUL BY-PRODUCT
Robert K. Ames, Seattle, Wash., assignor to The Boeing Company, Seattle, Wash., a corporation of Delaware
Filed Sept. 25, 1967, Ser. No. 670,160
Int. Cl. C07c 3/24, 1/12
U.S. Cl. 260—679
14 Claims

ABSTRACT OF THE DISCLOSURE

A Sabatier oxygen regeneration system is disclosed which produces a useful by-product. In the system carbon dioxide and hydrogen are reacted in a Sabatier reactor to produce methane and water, the methane and water are separated, and the water is electrolyzed to produce hydrogen and oxygen. The oxygen is recovered. The methane is thermally decomposed at a temperature above about 1790° K. so as to produce acetylene and hydrogen. The acetylene is recovered for further use, such as in the chemical synthesis of food. The hydrogen is recycled to the Sabatier reactor.

Field of the invention

This invention relates to the regeneration of oxygen from carbon dioxide by the Sabatier method, and more in particular, to the regeneration of oxygen in a modified Sabatier system which produces a useful by-product.

Background of the invention including certain objects thereof

The basic Sabatier oxygen regeneration system comprises a Sabatier reactor, an electrolytic cell, and a source of carbon dioxide. In his U.S. Patent 3,079,237, T. I. Taylor proposed to use this system as a means of eliminating the carbon dioxide which tends to accumulate in a manned space vehicle. While the system no doubt is useful for this purpose, there is the problem of what to do with the methane which is a by-product of the reactor. Taylor contemplated that it should be eliminated altogether, as by converting it to carbon and hydrogen, and wasting away the carbon. However, carbon is difficult to collect and waste from a space vehicle and, in addition, Taylor's system requires makeup hydrogen from an outside source, in order to balance the system. Hydrogen is difficult to store on a spacecraft, and when available, it is something which is not readily relinquished from other uses on the craft.

One object of the present invention is to devise a modification of the Sabatier system, wherein the methane by-product is converted to an end product which is highly useful on a spacecraft or other vehicle in which metabolic carbon dioxide tends to accumulate. Another object is to devise a modified system of this nature wherein the methane by-product is converted to a gaseous end product which is more useful on the spacecraft than the methane itself. A still further object is to devise a system of this nature wherein the gaseous end product is suitable for chemical or biological synthesis of food, and/or reaction jet control of the spacecraft. Still another object is to devise a system of this nature wherein only water is required as a make-up material for balancing the system.

Still other objects will become apparent from the description of the invention which follows hereafter.

Summary of the invention

These objects and advantages are realized by a system of my invention wherein carbon dioxide and hydrogen are reacted in a Sabatier reactor to produce methane and water, the methane and water are separated from one another, and the water is electrolyzed to produce hydrogen and oxygen. The oxygen is recovered. The methane is thermally decomposed at a temperature above about 1790° K. so as to produce acetylene, and the acetylene is recovered for further usages such as outlined above. Preferably, the methane is decomposed by contacting it with a high temperature plasma, and quenching the reaction product therefrom to produce acetylene and hydrogen. The hydrogen is recycled to the Sabatier reactor.

The plasma may be a hydrogen plasma and may be formed in a plasma jet. The hydrogen may be supplied to the jet from that produced in the electrolytic cell.

It is preferred to quench the reaction product in a hydrogen bath. Here, again, the bath may be supplied from the hydrogen produced in the electrolytic cell.

The acetylene is preferably recovered in an acetylene adsorber. The acetylene may be used for reaction jet control of the spacecraft; or it may be used as a carbon source for the prodution of food, either by chemical synthesis or biological formation.

To balance the system makeup water is supplied to the electrolytic cell. The water can can be either stored water or metabolically produced water.

Preferred embodiments of the invention

The foregoing features will be better understood by referring to the accompanying drawing wherein:

FIGURE 1 is a schematic illustration of a preferred embodiment of the system;

FIGURE 2 is a graph relating to one stage in the system; and

FIGURE 3 is a schematic representation of the means employed in this stage.

Referring to FIGURE 1, metabolic carbon dioxide removed from the cabin of a spaceship is introduced to the system in a feed line 2 at the rate of 2.25 lbs. per man day. The carbon dioxide may be removed, for example, by a regenerable molecular sieve subsystem, not shown. The feed line 2 intersects another feed line 4 wherein the carbon dioxide is mixed with hydrogen derived from sources within the system. The hydrogen is supplied at the rate of 0.410 lb. per man day, there being two sources for it, one of which is seen at 5 and the other of which is seen at 6. Each of lines 5 and 6 supplies hydrogen at the rate of 0.205 lb. per man day.

The mixture of hydrogen and carbon dioxide is fed to a Sabatier reactor 7 similar to that used in the aforementioned Taylor patent. The reactor may employ nickel, ruthenium, or any of the other catalysts mentioned therein. The Sabatier reaction produces methane and water which are fed from the reactor outlet 8 to a water separator 10. The water is condensed in the separator and fed to an electrolytic cell at the rate of 1.84 lbs. per man day. The methane is fed in line 12 to a methane reactor 13. In order to balance the system, makeup water 14 is added to the process-water feed line 15 at the rate of 0.46 lb. per man day.

The electrolytic cell 11 is also similar to that employed in the Taylor patent, and the oxygen produced therein discharges at the rate of 2.05 lbs. per man day. The oxygen is recovered at 16 and collected in a storage tank, not shown. The hydrogen produced in the cell discharges into line 17 at the rate of 0.460 lb. per man day. Of this, 0.205 lb. per man day is cycled along line 5 to the Sabatier reactor, as indicated earlier. The remaining 0.255 lb. is conveyed along another line 20 to the methane reactor 13.

The methane reactor receives methane from the water separator 10 at the rate of 0.82 lb. per man day. In the reactor, the methane is contacted with a plasma which rapidly elevates its temperature to above about 1790° K. Following a brief contact period, the plasma is quenched in a fluid bath which "freezes" the thermal decomposition of the methane at the acetylene step.

Preferably, the methane reactor includes a plasma jet reactor such as that illustrated schematically in FIGURE 3. As seen, the reactor 22 has a plasma formation stage, and a reaction stage interconnected therewith by a nozzle. The reaction stage is followed by a quench stage. The plasma formation stage comprises a thoriated tungsten cathode 24 and a copper anode 26 which is formed into a nozzle about one end of the cathode. Both the cathode and the anode are water cooled to prevent erosion by the high temperature plasma which is formed. The reaction stage comprises an insulated carbon reaction tube 28 which receives the discharge from the plasma stage. The tube is characterized with a plurality of holes or slots 30 through which the methane from line 12 is introduced into the plasma. The reaction tube in turn discharges along a quench tube 32 which is also characterized with a plurality of holes or slots 34 for the introduction of a quench fluid into the high temperature plasma. In accord with the invention, both the plasma and the quench fluid are preferably formed from hydrogen generated in the electrolytic cell.

The hydrogen conveyed through line 20 is introduced into the plasma formation stage where it is heated and discharged as a "jet" through the nozzle into the reaction tube. In the tube, methane from the water separator is introduced into the plasma. The length of the tube is such, together with the temperature and pressure therein, to raise the methane to the required temperature before the reaction product discharges into the quench stage. In the quench stage, the reaction product is quenched with hydrogen at the acetylene step, and the acetylene discharges along the line 36 into an acetylene sorber 38, together with any unreacted hydrogen and methane.

As is known, methane decomposes to carbon and hydrogen in a number of stages producing various intermediate products, namely ethane, then ethylene, then acetylene which is finally converted to carbon and hydrogen. FIGURE 2 is a logarithmitic representation of the reaction rate constant versus the temperature in degrees K for the methane, ethane, ethylene and acetylene decomposition stages. As seen, when high temperatures are attained, the reaction rates of the methane, ethane and ethylene decomposition stages ($K_1 K_2$ and $K_3$) are considerably faster than the reaction rate of the acetylene to carbon decomposition stage ($K_4$). Therefore, by maintaining the temperature of the $K_3$ and $K_4$ stages above that of the $K_1$ stage, and the reaction temperature of the $K_4$ stage below that of the $K_1$ stage, it is possible to minimize the formation of carbon. Preferably, a temperature should be attained between the point at which $K_1$ crosses $K_4$, and the point at which $K_1$ crosses $K_3$. The former, approximately 1790° K., is critical for acetylene formation. The latter is less determinative, depending on the methane conversion fraction desired.

G. I. Koglov and V. G. Knorre reported the methane conversion fraction as against the temperature and reaction time, in "Combustion and Flame," volume 6, December 1962, pages 253–263. As seen therein, conversion of 70–80% of the methane occurs at approximately 2100 K. and a 0.2 millisecond reaction time. A 1.0–0.1 millisecond reaction time is preferred, therefore, although a 10.0–0.1 millisecond range is possible.

I also prefer to use a plasma pressure of less than 1 atmosphere. The remainder of the system can be operated at 1 atmosphere.

The power required for the plasma reactor is 90–115 watts per man.

While a hydrogen plasma and a hydrogen quench are particularly advantageous in my system, under some circumstances argon and other gases can be used to form the plasma, and water and other fluids can be used to form the quench.

In the sorber 38, the acetylene is contacted with synthetic zeolites such as a "molecular sieve" material. Assuming a design point of loss of one percent of the available methane, and a plasma reactor efficiency of seventy percent, a system capable of servicing six men requires an adsorption bed of 3.2 lbs. of four angstrom molecular sieve material on an hourly cycle. To allow for bed inefficiency in a dynamic situation, 4.15 lbs. are preferred. This amount of 4 angstrom material can be packed in a three inch diameter, by six inch, can. Two of these along with a switching valve need total no more than ten pounds.

Silica gel and activated charcoal may also be employed.

In the system above described 0.665 lb. of acetylene are recovered per man day. The acetylene is discharged into line 40, from whence it is collected and stored for further use.

In addition to those noted, other modifications and additions can be made in and to the invention, without departing from the scope and spirit of the same as defined in the following claims.

I claim as my invention:

1. A process for the regeneration of oxygen from carbon dioxide comprising reacting carbon dioxide and hydrogen in a Sabatier reaction to produce methane and water, separating the methane and water, electrolyzing the water to produce hydrogen and oxygen, recovering the oxygen, thermally decomposing the methane at a temperature above 1790° K. so as to produce acetylene, and recovering the acetylene.

2. The process according to claim 1 wherein hydrogen is also produced from the thermal decomposition of the methane, and the hydrogen is recycled to the Sabatier reactor.

3. The process according to claim 1 wherein the methane is decomposed by contacting it with a high temperature plasma, and quenching the reaction product therefrom to produce acetylene.

4. The process according to claim 3 wherein the plasma is a hydrogen plasma.

5. The process according to claim 4 wherein the plasma hydrogen is supplied from the hydrogen produced in the water electrolyzation stage.

6. The process according to claim 3 wherein the plasma reaction product is quenched in a hydrogen bath.

7. The process according to claim 6 wherein the bath hydrogen is supplied from the hydrogen produced in the water electrolyzation stage.

8. The process according to claim 1 wherein the acetylene is recovered by adsorption.

9. A cyclic system for regenerating oxygen from carbon dioxide, comprising first reaction means including a Sabatier reactor and an electrolytic cell for converting the carbon dioxide into methane and water, and then converting the water into hydrogen and oxygen, second reaction means including a plasma reactor for thermally decomposing the methane to produce a gaseous reaction product therefrom, and means for recovering each of the oxygen and the gaseous reaction product.

10. The system according to claim 9 further comprising means for supplying a portion of the hydrogen produced in the electrolytic cell, to the plasma reactor, to form the plasma.

11. The system according to claim 9 wherein the plasma reactor has a quench stage therein.

12. The system according to claim 11 further comprising means for supplying a portion of the hydrogen produced in the electrolytic cell, to the quench stage, to serve as the quench medium.

13. The system according to claim 9 wherein the plasma reactor is a plasma jet reactor.

14. The system according to claim 9 wherein the recovery means includes an adsorption bed for the gaseous reaction product.

References Cited

UNITED STATES PATENTS

| | | | |
|---|---|---|---|
| 3,248,446 | 4/1966 | Pollock et al. | 260—679 |
| 3,370,918 | 2/1968 | Begley | 260—679 |
| 3,079,237 | 2/1963 | Taylor | 23—4 |
| 3,085,053 | 4/1963 | Taylor | 23—4 |

DELBERT E. GANTZ, Primary Examiner

J. D. MYERS, Assistant Examiner

U.S. Cl. X.R.

23—4